United States Patent
Quioc et al.

(10) Patent No.: US 9,914,425 B1
(45) Date of Patent: Mar. 13, 2018

(54) HOUSING STRUCTURE FOR GAS GENERATING SYSTEM

(71) Applicant: TK Holdings Inc., Armada, MI (US)

(72) Inventors: Eduardo L. Quioc, Westland, MI (US); Bryan T. Cole, Warren, MI (US)

(73) Assignee: TK Holdings Inc., Auburn Hills, MI (US)

( * ) Notice: Subject to any disclaimer, the term of this patent is extended or adjusted under 35 U.S.C. 154(b) by 218 days.

(21) Appl. No.: 14/590,939

(22) Filed: Jan. 6, 2015

Related U.S. Application Data

(63) Continuation of application No. 12/586,929, filed on Sep. 30, 2009, now Pat. No. 8,925,464.

(51) Int. Cl.
*B60R 21/264* (2006.01)
*C06D 5/00* (2006.01)

(52) U.S. Cl.
CPC .............. *B60R 21/264* (2013.01); *C06D 5/00* (2013.01)

(58) Field of Classification Search
CPC ...... B60R 21/2644; B60R 2021/26076; B60R 2021/2648; B60R 21/264; C06D 5/00
See application file for complete search history.

(56) References Cited

U.S. PATENT DOCUMENTS

| | | | | |
|---|---|---|---|---|
| 5,306,041 | A * | 4/1994 | Ogawa | B60R 21/2644 102/530 |
| 6,183,006 | B1 * | 2/2001 | Katsuda | C06D 5/06 280/736 |
| 6,701,849 | B2 * | 3/2004 | McFarland | B60R 21/2644 102/530 |
| 8,925,464 | B1 | 1/2015 | Quioc et al. | |
| 2002/0158455 | A1 * | 10/2002 | Bergerson | B60R 21/264 280/737 |
| 2005/0263994 | A1 * | 12/2005 | Quioc | B60R 21/2644 280/741 |
| 2006/0082113 | A1 * | 4/2006 | Smith | B60R 21/26 280/741 |
| 2008/0122207 | A1 * | 5/2008 | Domazet | B60R 21/2644 280/741 |
| 2008/0136152 | A1 * | 6/2008 | McFarland | B60R 21/2644 280/736 |
| 2010/0117345 | A1 * | 5/2010 | Mayville | B60R 21/2644 280/741 |
| 2011/0221176 | A1 * | 9/2011 | Bierwirth | B60R 21/2644 280/741 |

* cited by examiner

*Primary Examiner* — Darlene P Condra
(74) *Attorney, Agent, or Firm* — Meunier Carlin & Curfman LLC

(57) ABSTRACT

A sub-assembly for a housing of a gas generating system is provided. The sub-assembly includes a housing portion and an insert attached to the housing portion such that at least a portion of a force applied to one of the housing portion and the attached insert is transferred through the attachment to the other one of the housing portion and the attached insert. A housing, a gas generating system, and a vehicle occupant protection system incorporating the sub-assembly are also disclosed.

20 Claims, 3 Drawing Sheets

HOUSING STRUCTURE FOR GAS GENERATING SYSTEM

CROSS REFERENCE TO RELATED APPLICATIONS

This application is a continuation of, and claims the benefit of, copending U.S. application Ser. No. 12/586,929 (filed on Sep. 30, 2009), which claims the benefit of U.S. Provisional Patent Application Ser. No. 61/194,734 filed on Sep. 30, 2008, the disclosures of which are incorporated by reference herein in their entireties.

BACKGROUND OF THE INVENTION

The present invention relates to gas generating systems and, more particularly, to a housing structure for a gas generating system.

SUMMARY OF THE INVENTION

In one aspect of the embodiments described herein, a sub-assembly for a housing of a gas generating system is provided. The sub-assembly includes an outer housing portion including a first portion, a first opening formed in the first portion, and a wall extending from a circumference of the outer housing first portion in a first direction. The housing portion first portion and wall combine to define a first receptacle opening from the first portion in the first direction. An insert includes a first portion, a second opening formed in the insert first portion, and a wall extending from a circumference of the insert first portion in the first direction. The insert first portion and wall define another receptacle opening from the insert first portion in the first direction. The insert first portion is attached directly to the housing portion first portion such that at least a portion of a force applied to the housing portion first portion is transferred through the attachment to the insert first portion, and such that the first and second openings are aligned so as to enable insertion of a portion of an initiator assembly through the first and second openings, from an interior of the other receptacle through the insert first portion and the outer housing first portion, after direct attachment of the insert first portion to the outer housing first portion.

In another aspect of the embodiments described herein, a sub-assembly for a housing of a gas generating system is provided. The sub-assembly includes an outer housing portion including a first portion and a wall extending from a circumference of the first portion in a first direction. The housing portion first portion and wall define a first receptacle opening from the first portion in the first direction. The outer housing portion wall includes at least one gas exit aperture formed therealong. An insert includes a first portion and a wall extending from a circumference of the first portion in the first direction. The insert first portion and wall define another receptacle opening from the insert first portion in the first direction. The insert first portion is attached directly to the housing portion first portion such that at least a portion of a force applied to the housing portion first portion is transferred through the attachment to the insert first portion.

In another aspect as shown in FIG. 1, the sub-assembly described above has an insert wall that extends opposite the at least one gas exit aperture, so as to form a gas flow passage between the insert wall and the outer housing portion wall.

In yet another aspect shown in FIG. 1, the insert wall extends a first distance from the outer housing first portion, wherein the at least one gas exit aperture is positioned at a second distance from the outer housing portion first portion, and wherein the second distance is greater than the first distance.

DETAILED DESCRIPTION

Figure 1:
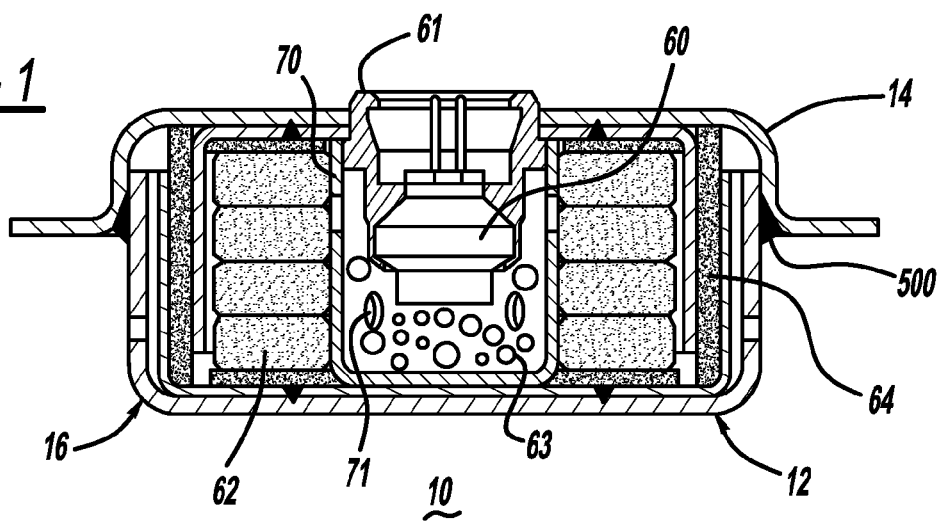
FIG. 1 is a cross-sectional side view of a gas generating system incorporating a housing including first and second housing portions constructed in accordance with one embodiment of the present invention.
Figure 2:
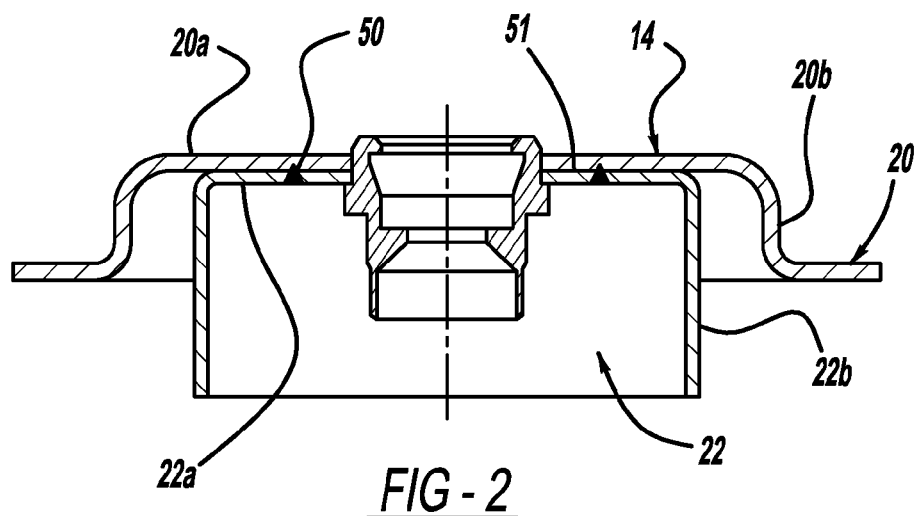
FIG. 2 is a cross-sectional side of the first housing portion shown in FIG. 1.

FIG. 1 is a cross-sectional view of an exemplary gas generating system 10 including a housing 12 incorporating a first housing portion 14 and a second housing portion 16 in accordance with one embodiment of the present invention. FIG. 2 is a cross-sectional view of the first housing portion 14 incorporated into the embodiment shown in FIG. 1, and FIG. 3 is a cross-sectional view of the second housing portion 16 incorporated into the embodiment shown in FIG. 1.

Referring again to the embodiment shown in FIG. 1, gas generating system 10 also includes an igniter 60 secured to first housing portion 14 using crimping, welding, or any of a variety of other known methods. Igniter 60 is positioned and secured so as to ignitably communicate with a gas generant 62 also contained within housing 12. Igniter 60 may be formed as known in the art. One exemplary igniter construction is described in U.S. Pat. No. 6,009,809, herein incorporated by reference.

A booster tube 70 encloses the igniter and the portion of end closure 61 extending into the housing. Tube 70 includes openings 71 therein to enable fluid communication between the interior of the tube and gas generant 62 exterior of the tube. Tube 70 defines a cavity for receiving therein a quantity of a known booster material 63 for facilitating ignition of the gas generant 62 in a known manner. A known auto-ignition material (not shown) may be positioned in thermal communication with a portion of housing 12 and so as to enable fluid communication with booster material 63 upon ignition of the auto-ignition material. As is known in the art, when the exterior of housing 12 is exposed to a flame or other suitable elevated temperature event, the auto-ignition material will ignite and initiate combustion of booster material 63 and, subsequently, gas generant 62.

Figure 3:
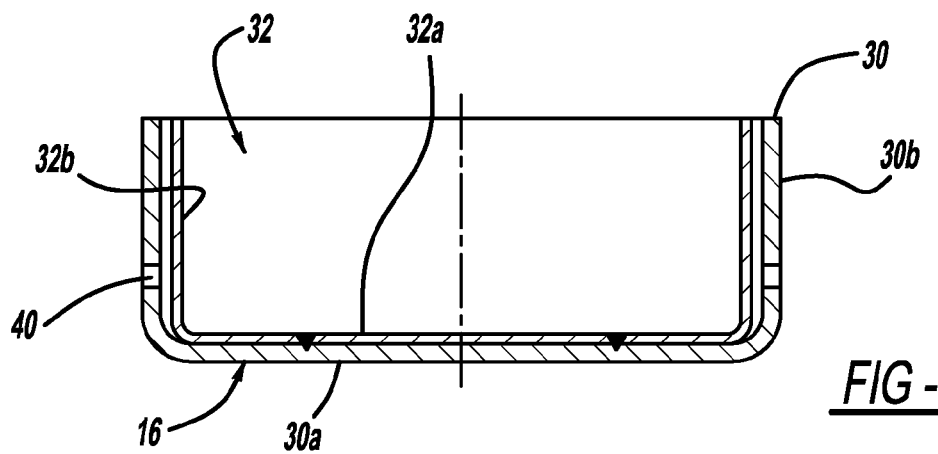
FIG. 3 is a cross-sectional side of the second housing portion shown in FIG. 1.

In the embodiment shown in FIGS. 1-3, first housing portion 14 is in the form of a base assembly and second housing portion 16 is in the form of a cap assembly which is configured for mating and securement to the base assembly, using welding or other suitable securement methods known in the art. In the embodiment shown in FIG. 1, first housing portion 14 and second housing portion 16 are attached to each other by a weld 500. In a particular embodiment, the weld 500 is a circumferential weld 500 which hermetically seals the seam between the housing portions.

In the embodiment shown in FIG. 2, first housing portion 14 includes a base 20 having a first portion 20a and an outer wall 20b extending from a circumference of first portion 20a to define a receptacle. Base 20 may be formed from a metal, metal alloy, or other suitable material using known methods.

A first insert 22 has a first portion 22a and a wall 22b extending from a circumference of first portion 22a to define a receptacle. In the embodiment shown in FIGS. 1 and 2, first insert 22 forms a receptacle for positioning and retaining therein a stack of gas generant wafers 62 (described below) positioned in housing 12. However, either first insert 22 or second insert 32 (described below) may be configured and positioned as desired to receive therein at least a portion of the gas generant, at least a portion of a filter (described below), or any other desired element residing in the housing interior, to aid in positioning and securing the desired element within the housing, and provided that the positioning of the first or second insert enables securement of the insert to a respective one of base 20 or cap 30 in a manner described below. First insert 22 may be formed from a metal, metal alloy, or other suitable material using known methods.

First insert first portion 22a is attached to base first portion 20a such that at least a portion of a force applied to one of the base first portion 20a and the attached insert 22 is transferred to the other one of the base first portion 20a and the attached first insert first portion 22a through the attachment. As used herein, the terms "attach" and "attachment" as applied to the connection between the housing portion and an associated insert are understood to mean that the insert is connected to the housing portion by a mechanism other than simple contact between the parts. Thus, an attachment as contemplated herein would be a connection between the parts such as a weld, adhesive bond, or some other connection suitable for the purposes described herein.

The insert portion may be in contact with the housing portion to which it is attached. Alternatively, the insert may be spaced apart from the housing portion by the attachment. In a particular embodiment, the insert is in contact with the housing portion at a location where the insert is attached to the housing portion.

Thus attached, the first insert acts as a structural reinforcement for base first portion 20a when a pressure is applied to the base first portion, thereby forming a sub-assembly for use in fabricating housing 12. This structurally reinforces the region of housing first portion 14 farthest from weld 500 that is exposed to the high-pressure gases, and which is subject to the greatest deflection due to forces exerted by high-pressure gases. The region of the first housing portion farthest from weld 500 is buttressed or supported by the first insert 22 welded or otherwise suitably attached thereto and application of the additional material (i.e., the insert) for reinforcement of the housing portion is directed to the area of the housing portion where it is most useful. Thus, the stresses in the part of housing first portion 14 farthest from weld 500 are reduced. Also, as stated previously, the insert portion may also be structured so as to provide support for other elements of the gas generating system, or to perform partitioning or other desired functions within the system housing 12.

In the embodiment shown in FIG. 2, base first portion 20a and first insert first portion 22a are both formed from a metal or metal alloy, and base first portion 20a and first insert first portion 22a are positioned as shown and welded together by forming an endless, continuous weld 50 using any of a variety of known methods (for example, resistance welding). In one embodiment, weld 50 circumscribes a region between the housing portion and the insert. As used herein, the term "circumscribe" is understood to mean "to mark off; define, or delimit". Also, as used herein, the term "endless" as applied to weld 50 is understood to mean that the ends of a single length of the weld are joined, forming, for example, a circle, ellipse, square, or other shape without an unattached end. The continuous weld 50 may prevent pressurized gases residing within housing 12 (due, for example, to combustion of gas generant 62) from entering a region 51 between base first portion 20a and first insert first portion 22a enclosed or circumscribed by the weld.

Any type of welding suitable for the application (for example, spot welding, friction welding, inertia welding, or tungsten inert gas welding) may be employed for attaching the inserts to the housing portions. In addition, any other suitable method of attaching the inserts to the housing portions may be employed. Any attachment method used should be capable of maintaining the attachment between the housing portion and an associated insert during the conditions of elevated temperature and pressure prevailing inside the housing after activation of the gas generating system, and also during exposure of the attachment to any by-products of gas generant material combustion.

In the manner described above, the effective thickness of base first portion 20a is increased by affixing the first insert 22 thereto, and at least a portion of the forces produced by the pressurized gases act on what is effectively the thickest section of the housing first portion 14. This enables the actual thickness of the housing first portion 14 or base first portion 20a to be reduced, while still providing this portion of the housing with an equivalent or greater level of resistance to deformation resulting from forces exerted by pressurized gases.

In addition, by controlling the diameter or outer dimensions of the insert portions attached to the housing portions, the effective material thickness of the housing wall can be increased over a desired percentage of the wall surface area exposed to elevated pressure, thereby reducing the stresses in first housing portion 14 due to high-pressure gases. Thus, the majority of the force acting on the central region of base first portion 20a due to pressurized gases within the housing can be transmitted through first insert first portion 22a.

In another aspect of the embodiments of the present invention, a sub-assembly for a housing of a gas generating system is provided including a housing portion, and an insert having a attached to a section of the housing portion such that deformation of one of the housing portion and the attached insert is impeded by the other one of the housing portion and the attached insert via the attachment. As used herein, the term "deformation" as applied to either of housing portions 14 and 16 and either of inserts 22 and 32 is understood to mean any deflection or deviation of the attached sections of a housing portion and a respective attached insert portion from their shapes when the part is in an unpressurized state. It is believed that deformation of base first portion 20a due to forces exerted by pressurized gases is impeded by the attachment of first insert first portion 22a to the base first portion. That is, the attachment (by welding or any other suitable means) of first insert first portion 22*a* to the base first portion buttresses the base first portion and restrains its deflection.

In another particular embodiment, attachment between the housing portion and an associated insert is in the form of an array of spaced-apart spot welds. It is believed that the spacing between the spot welds can be controlled to limit deflection of the housing portion and the attached insert in the vicinity of the welds. That is, it is believed that where a spacing between the welds is relatively smaller, deflection of the housing portion and the attached insert in the interstices between the welds will be correspondingly smaller, due to increased rigidity of the interstitial housing portion and insert material resulting from the more closely-spaced welded attachments.

It has been found that a relatively thinner housing portion with an insert attached thereto as described herein exhibits a resistance to deformation due to elevated pressure equivalent to the resistance to deformation of a housing portion having a material thickness equal to the sum of the thicknesses of the housing portion and the insert. However, the relatively smaller insert uses less material than would be required to increase the overall thickness of the housing portion. Thus, a housing sub-assembly in accordance with an embodiment described herein can be fabricated to weigh less than a housing formed of a thicker material.

In the embodiment shown in FIG. 3, second housing portion 16 includes a cap 30 having a first portion 30*a* and an outer wall 30*b* extending from a circumference of first portion 30*a* to define a receptacle.

In the embodiment shown in FIGS. 1-3, a second insert 32 forms a receptacle for positioning and retaining therein a portion of a filter 64 (described below) positioned in housing 12. However, as stated above, either first insert 22 or second insert 32 may be configured and positioned as desired to receive therein at least a portion of the gas generant, at least a portion of the filter, or any other desired element residing in the housing interior, to aid in positioning and securing the desired element within the housing, and provided that the positioning of the first or second insert enables securement of the insert to a respective one of base 20 or cap 30 in a manner described below.

In accordance with the present invention, a plurality of gas exit apertures 40 is formed along cap 30 to enable fluid communication between an interior of housing 12 and an exterior of the housing. Cap 30 may be formed from a metal, metal alloy, or other suitable material using known methods.

Second insert 32 has a first portion 32*a* and an outer wall 32*b* extending from a circumference of first portion 32*a* to define a receptacle. Second insert 32 may be formed from a metal, metal alloy, or other suitable material using known methods. Second insert first portion 32*a* is secured to cap first portion 30*a* so as to act as a structural reinforcement for cap first portion 30*a* when a pressure is applied to the cap first portion, thereby forming a sub-assembly for use in fabricating housing 12.

In the embodiment shown in FIG. 2, cap first portion 30*a* and second insert first portion 32*a* are both formed from a metal or metal alloy, and cap first portion 30*a* and second insert first portion 32*a* are positioned as shown and welded together, using any of a variety of known methods (for example, resistance welding). The purpose and operation of second insert 32 with regard to cap 30 is the same as previously described for first insert 22 with regard to base 20.

The gas generant 62 in gas generating system 10 may comprise any gas generant composition known for its utility in vehicle occupant protection systems. Co-owned U.S. Pat. Nos. 5,035,757, 5,756,929, 5,872,329, 6,077,371, 6,074,502, and 6,210,505 are incorporated herein by reference and exemplify, but do not limit gas generant compositions contemplated in accordance with the present invention.

If desired, a quantity of a known booster compound (not shown) may be positioned in the housing so as to enable fluid communication between the booster compound and gas generant 62 upon activation of the gas generating system. The booster compound facilitates ignition of the gas generant in a known manner.

A filter 64 may be incorporated into the gas generating system design for filtering particulates from gases generated by combustion of gas generant 62. In general, filter 64 is positioned between gas generant 62 and openings 40 formed along cap 30. The filter may be formed from any of a variety of materials (for example, a carbon fiber mesh or sheet) known in the art for filtering gas generant combustion products.

A quantity of a known auto-ignition composition (not shown) may be positioned proximate gas generant material 62.

Figure 4:
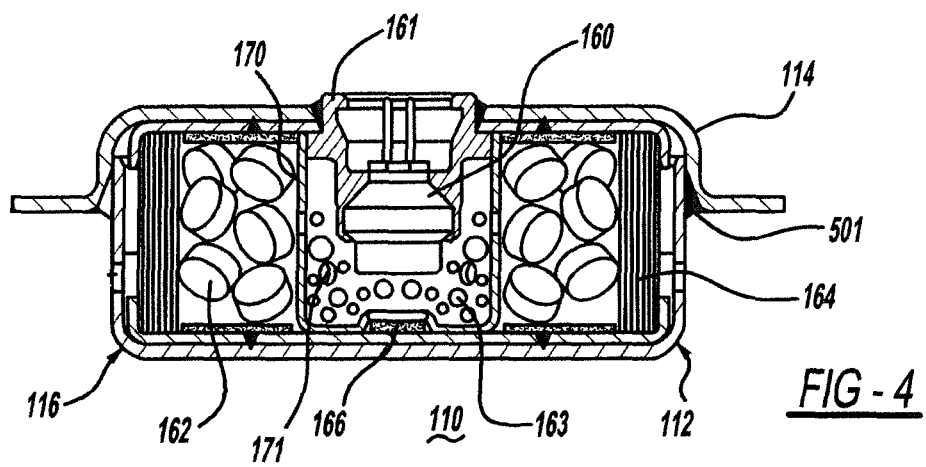
FIG. 4 is a cross-sectional side view of a gas generating system incorporating a housing including first and second housing portions constructed in accordance with another embodiment of the present invention.
Figure 5:
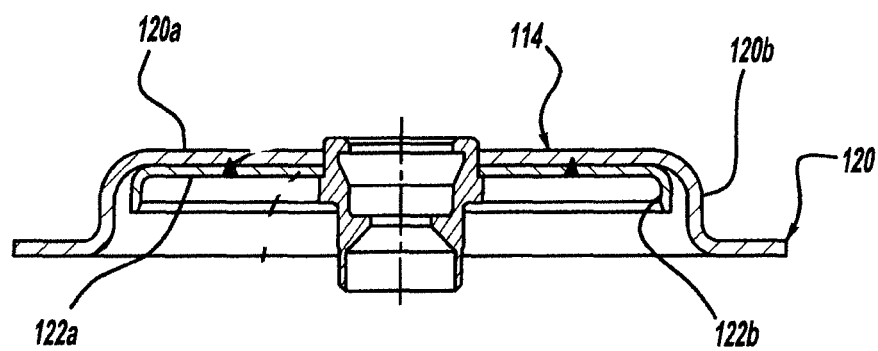
FIG. 5 is a cross-sectional side of the first housing portion shown in FIG. 4.
Figure 6:
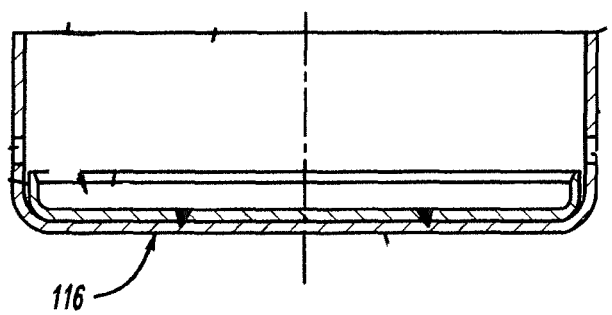
FIG. 6 is a cross-sectional side of the second housing portion shown in FIG. 5.

FIGS. 4-6 show another embodiment of a gas generating system, incorporating other embodiments 114, 116 of first and second housing portions constructed in a manner similar to housing portions 14 and 16 previously described. Features in FIGS. 4-6 that are similar to corresponding features in FIGS. 1-3 have been given similar element numbers.

In the embodiment shown in FIG. 4, first housing portion 114 and second housing portion 116 are attached to each other using a circumferential weld 501 which hermetically seals the seam between the housing portions. An igniter 160 is secured within and end closure 161 and extends into housing 112. A booster tube 170 encloses the igniter and the portion of end closure 161 extending into the housing. Tube 170 includes openings 171 therein to enable fluid communication between the interior of the tube and gas generant 162 exterior of the tube. Tube 170 defines a cavity for receiving therein a quantity of a known booster material 163 for facilitating ignition of the gas generant 162 in a known manner. A known auto-ignition material 166 may be positioned in thermal communication with a portion of housing 112 and so as to enable fluid communication with booster material 163 upon ignition of the auto-ignition material. As is known in the art, when the exterior of housing 112 is exposed to a flame or other suitable elevated temperature event, the auto-ignition material 166 will ignite and initiate combustion of booster material 163 and, subsequently, gas generant 162.

Referring again to FIG. 1, operation of the gas generating system will now be discussed. The embodiment shown in FIGS. 4-6 is operated in a similar manner. When a crash event occurs or is imminent, a signal from a crash sensor (such as sensor 158 in FIG. 7) is conveyed to igniter 60, thereby activating the igniter and generating flame and ignition products. The flame and ignition products propagate outwardly from initiator 48 to ignite booster material 63. By-products from the combustion of booster material 63 flow out of tube 70 via openings 71 formed in the tube. These combustion by-products initiate combustion of the gas generant 62. The resulting gases flow through filter 164 and out of housing 12 via openings 40. Stresses in housing portions 14 and 16 due to elevated pressure are reduced as previously described by attachment of associated insert portions 22 and 32 thereto.

Figure 7:
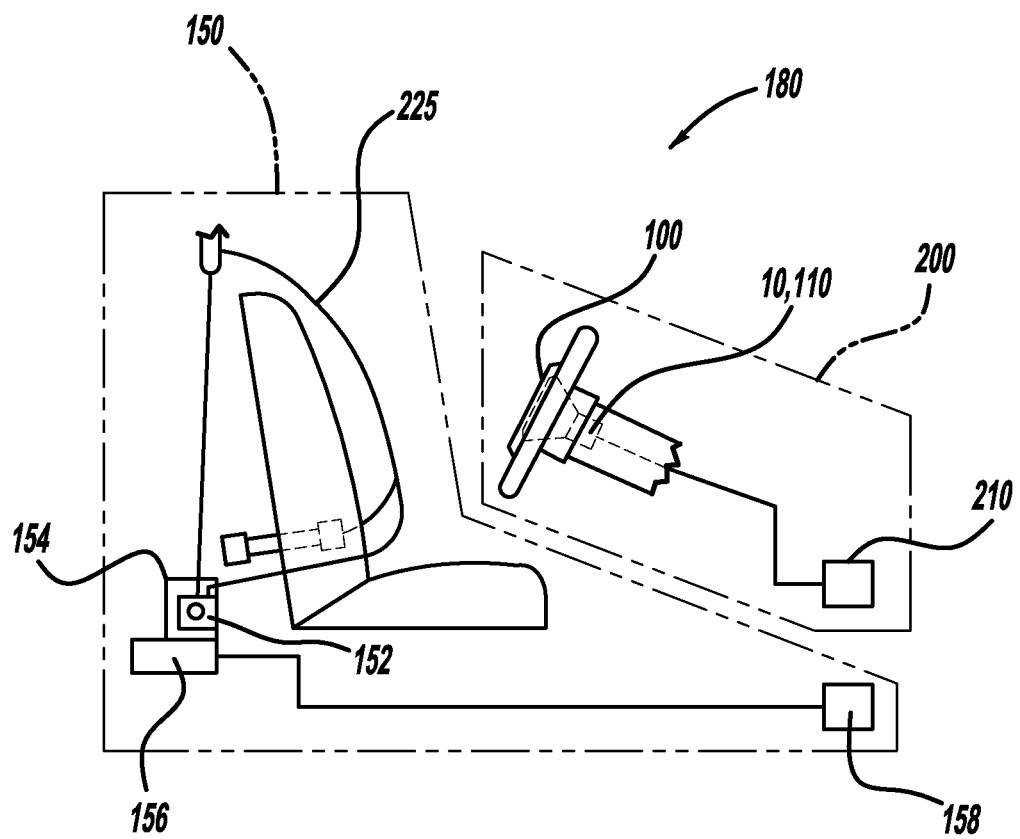
FIG. 7 is a schematic view of an airbag system and a vehicle occupant protection system incorporating a gas generating system including housing portions constructed in accordance with an embodiment of the present invention.

FIG. 7 shows a particular application of a gas generating system including a housing including one or more housing sub-assemblies constructed in accordance with one of the embodiments described above. Referring to FIG. 7, a gas generating system as described above may be incorporated into a driver side airbag module 100. Airbag module 100 comprises a module housing 102 having a rupturable frontal closure, an airbag, and a gas generating system 10, 110 in accordance with one of the embodiments previously described.

Referring again to FIG. 7, airbag module 100 or a gas generating system 10, 110 including a housing in accordance with any of the embodiments described above may also be incorporated into a broader, more comprehensive vehicle occupant protection system 180 including additional elements such as, for example, a safety belt assembly 150. FIG. 7 shows a schematic diagram of one exemplary embodiment of such a protection system. Airbag module 100 may include (or be in communication with) a crash event sensor 210 which is in communication with a known crash sensor algorithm that signals actuation of airbag module 100 via, for example, activation of an igniter in the gas generating system in the event of a collision.

Safety belt assembly 150 includes a safety belt housing 152 and a safety belt 225 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667, 161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A sub-assembly for a housing of a gas generating system, comprising:
an outer housing portion including a first portion, a first opening formed in the first portion, and a wall extending from a circumference of the outer housing portion first portion in a first direction, the outer housing portion first portion and wall defining a first receptacle opening from the first portion in the first direction; and
an insert including a first portion, a second opening formed in the insert first portion, and a wall extending from a circumference of the insert first portion in the first direction, the insert first portion and wall defining another receptacle opening from the insert first portion in the first direction, the insert first portion being attached directly to the outer housing portion first portion such that at least a portion of a force applied to the outer housing portion first portion is transferred through the attachment to the insert first portion,
and such that the first and second openings are aligned so as to enable insertion of a portion of an initiator assembly through the first and second openings, wherein no part of the insert extends past the outer housing portion first portion in a second direction opposite the first direction, and, wherein the insert contacts the outer housing portion only at said first portion of said outer housing portion.

2. The sub-assembly of claim 1 wherein the direct attachment between the insert first portion and the outer housing first portion is spaced apart from an edge of the first opening.

3. A gas generating system comprising a sub-assembly according to claim 1 and a second housing portion attached to the outer housing portion so as to form a gas-tight seal therebetween, the second housing portion including a first portion and a wall extending from a circumference of the second housing first portion in the second direction, the second housing portion first portion and second housing portion wall defining a receptacle opening from the second housing portion first portion in the second direction.

4. The system of claim 3 further comprising a second insert attached to the second housing portion, the second insert including a first portion and a non-perforated wall extending from a circumference of the second insert first portion in the second direction, the second insert first portion and second insert wall defining another receptacle opening from the second insert first portion in the second direction, the second insert first portion being attached directly to the second housing portion first portion such that at least a portion of a force applied to the second housing portion first portion is transferred through the attachment to the second insert first portion,
wherein said second housing wall has at least one gas exit aperture formed therealong.

5. The sub-assembly of claim 1 wherein both the outer housing first portion and the insert first portion are flat.

6. A sub-assembly for a housing of a gas generating system, comprising:
an outer housing portion including a first portion and a wall extending from a circumference of the first portion in a first direction, the outer housing portion first portion and wall defining a first receptacle opening opposing the outer housing portion first portion in the first direction, the outer housing portion wall including at least one gas exit aperture formed therealong; and
an insert including a first portion and a non-perforated wall extending from a circumference of the first portion in the first direction, the insert first portion and non-perforated wall defining a second receptacle opening opposing the insert first portion in the first direction, the insert first portion being attached directly to the outer housing portion first portion such that at least a portion of a force applied to the outer housing portion first portion is transferred through the attachment to the insert first portion;
wherein an end of the non-perforated insert wall opposite the insert first portion is positioned at a first distance from the outer housing first portion, wherein the at least one gas exit aperture is positioned at a second distance from the outer housing portion first portion, and wherein the second distance is greater than the first distance.

7. The sub-assembly of claim 6 wherein the insert first portion is welded directly to the outer housing portion first portion prior to attachment of the outer housing portion to another element of the gas generating system.

8. A vehicle occupant protection system comprising a gas generating system including a sub-assembly in accordance with claim 6, and an airbag module operatively coupled to the gas generating system.

9. The sub-assembly of claim 4 wherein the non-perforated insert wall extends opposite the at least one gas exit aperture, so as to form a gas flow passage between the non-perforated insert wall and the second housing portion wall.

10. The sub-assembly of claim 6 wherein the direct attachment between the insert first portion and the outer housing portion first portion is a weld.

11. The sub-assembly of claim 6 further comprising a second housing portion including a first portion, a first opening formed in the first portion, and a wall extending from a circumference of the second housing portion first portion in a second direction opposite the first direction, the second housing portion first portion and wall defining a third receptacle opening from the second housing portion first portion in the second direction; and
a second insert including a first portion, a second opening formed in the second insert first portion, and a wall extending from a circumference of the second insert first portion in the second direction, the second insert first portion being attached directly to the second housing portion first portion such that at least a portion of a force applied to the second housing portion first portion is transferred through the attachment to the second insert first portion, and such that the first and second openings are aligned so as to enable insertion of a portion of an initiator assembly through the first and second openings.

12. A sub-assembly for a housing of a gas generating system, comprising:
an outer housing portion including a first portion and a wall extending from a circumference of the first portion in a first direction, the outer housing portion first portion and wall defining a first receptacle opening opposing the outer housing portion first portion in the first direction, the outer housing portion wall including at least one gas exit aperture formed therealong;
a first insert including a first portion and a wall extending from a circumference of the first portion in the first direction, the first insert first portion and wall defining a second receptacle opening opposing the first insert first portion in the first direction, the first insert first portion being attached directly to the outer housing portion first portion such that at least a portion of a force applied to the outer housing portion first portion is transferred through the attachment to the first insert first portion;
a second housing portion including a first portion, a first opening formed in the first portion, and a wall extending from a circumference of the second housing portion first portion in a second direction opposite the first direction, the second housing portion first portion and wall defining a third receptacle opening from the second housing portion first portion in the second direction; and
a second insert including a first portion, a second opening formed in the second insert first portion, and a wall extending from a circumference of the second insert first portion in the second direction, the second insert first portion being attached directly to the second housing portion first portion such that at least a portion of a force applied to the second housing portion first portion is transferred through the attachment to the second insert first portion, and such that the first and second openings are aligned so as to enable insertion of a portion of an initiator assembly through the first and second openings,
wherein the first insert contacts the outer housing portion only at said first portion of said outer housing portion, and, wherein the second insert contacts the second housing portion only at said first portion of said second housing portion.

13. The sub-assembly of claim 12 wherein the first insert first portion is welded directly to the outer housing portion first portion prior to attachment of the outer housing portion to another element of the gas generating system.

14. A vehicle occupant protection system comprising a gas generating system including a sub-assembly in accordance with claim 12, and an airbag module operatively coupled to the gas generating system.

15. The sub-assembly of claim 12 wherein the first insert wall extends opposite the at least one gas exit aperture, so as to form a gas flow passage between the first insert wall and the outer housing portion wall.

16. The sub-assembly of claim 15 wherein the first insert first portion is welded directly to a cap first portion prior to attachment of the cap to another element of the gas generating system.

17. The sub-assembly of claim 15 wherein the direct attachment between the first insert first portion and the outer housing portion first portion is a weld.

18. The sub-assembly of claim 12 wherein an end of the first insert wall opposite the first insert first portion is positioned at a first distance from the outer housing first portion, wherein the at least one gas exit aperture is positioned at a second distance from the outer housing portion first portion, and wherein the second distance is greater than the first distance.

19. A sub-assembly for a housing of a gas generating system, comprising:
an outer housing portion including a first portion, a first opening formed in the first portion, and a wall extending from a circumference of the outer housing first portion in a first direction, the outer housing portion first portion and wall defining a first receptacle opening from the first portion in the first direction; and
an insert including a first portion, a second opening formed in the insert first portion, and a wall extending from a circumference of the insert first portion in the first direction, the insert first portion and wall defining another receptacle opening from the insert first portion in the first direction, the insert first portion being attached directly to the outer housing portion first portion such that at least a portion of a force applied to the outer housing portion first portion is transferred through the attachment to the insert first portion,
and such that inner edges of each of the first and second openings are aligned so as to enable insertion of a portion of an initiator assembly through the first and second openings, wherein the direct attachment between the insert first portion and the outer housing first portion is spaced apart from an edge of the first opening.

20. A sub-assembly for a housing of a gas generating system, comprising:
    an outer housing portion including a first portion, a first opening formed in the first portion, and a wall extending from a circumference of the outer housing first portion in a first direction, the outer housing portion first portion and wall defining a first receptacle opening from the first portion in the first direction; and
    an insert including a first portion, a second opening formed in the insert first portion, and a wall extending from a circumference of the insert first portion in the first direction, the insert first portion and wall defining another receptacle opening from the insert first portion in the first direction, the insert first portion being attached directly to the outer housing portion first portion such that at least a portion of a force applied to the outer housing portion first portion is transferred through the attachment to the insert first portion,
    and such that the first and second openings are aligned so as to enable insertion of a portion of an initiator assembly through the first and second openings, wherein both the outer housing first portion and the insert first portion are flat,
    wherein the insert contacts the outer housing portion only at said first portion of said outer housing portion.

* * * * *